Figure 3:
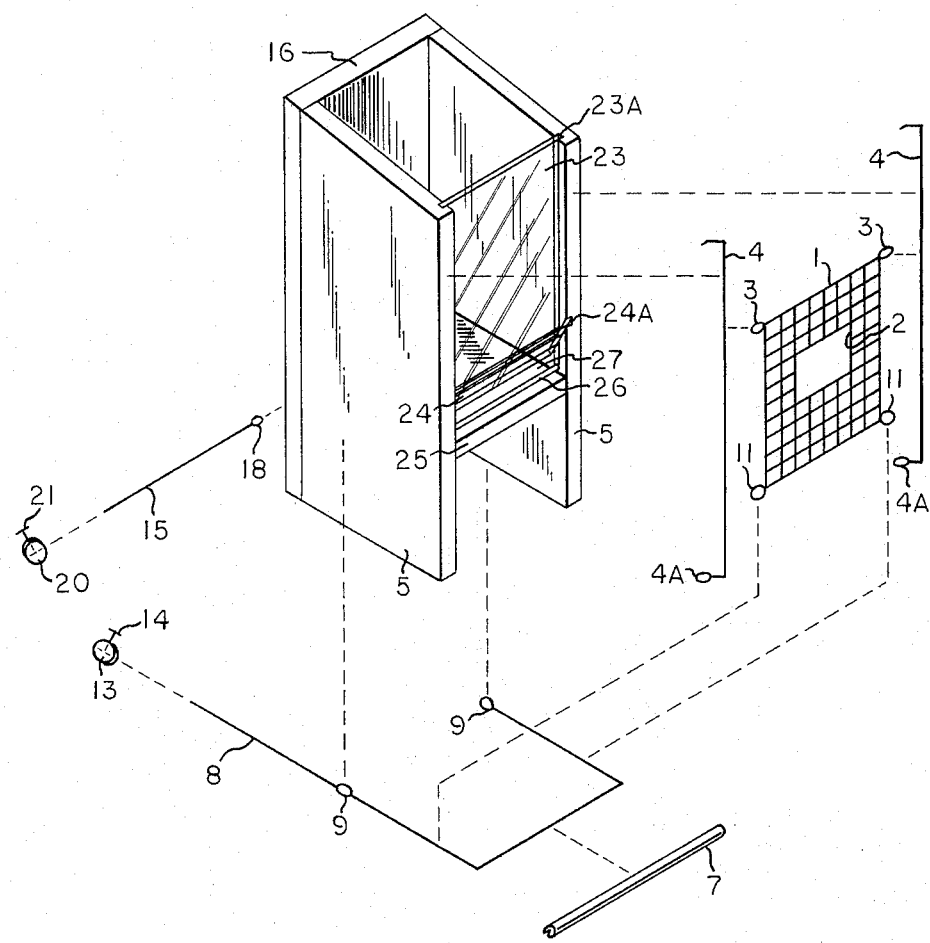

March 22, 1966
C. H. MEIER
3,241,525
SELECTIVE BIRD FEEDER
Filed Jan. 28, 1965
2 Sheets-Sheet 1
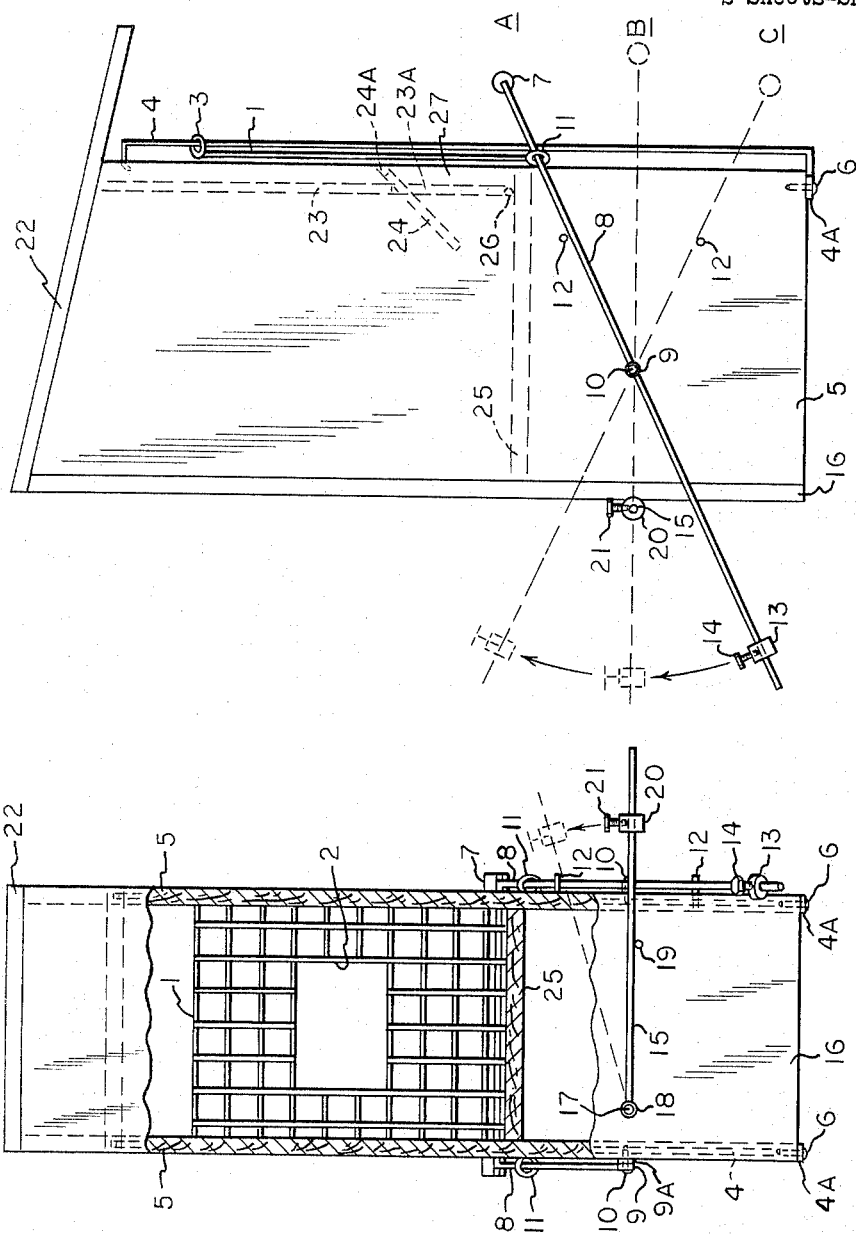
INVENTOR
CARL H. MEIER
BY *Wm. T. Me[signature]*
ATTORNEY INVENTOR
CARL H. MEIER
BY *Wm T. Hef*
ATTORNEY

United States Patent Office 3,241,525
Patented Mar. 22, 1966

3,241,525
SELECTIVE BIRD FEEDER
Carl H. Meier, 1206 Madison Ave., Burlington, Iowa
Filed Jan. 28, 1965, Ser. No. 428,621
3 Claims. (Cl. 119—55)

This invention relates to selective bird feeders and more particularly to a selective bird feeder which will make sunflower seeds available to medium sized birds such as cardinals but will exclude light or small birds such as house sparrows and also heavier birds such as blackbirds, bluejays and pigeons.

The cardinal prevails in most states east of the Mississippi River and is also found in some areas west of the Mississippi River. It tends to establish its own living territory and chases invading cardinals away. Rarely will more than 4 or 5 pairs of cardinals frequent the same feeding station. Its beauty and the fact that it is non-migratory place it high on the popularity list of people who feed birds. A favorite food of the cardinals is sunflower seed. Many people enjoy feeding sunflower seeds to cardinals but their efforts are discouraged by the action of the aggressive house sparrows and larger more common birds. These unwanted birds are much more numerous, often living and traveling in large flocks, and become a nuisance. All of these unwanted birds are extremely fond of sunflower seeds. The larger birds are able to eat the seed whole or crack it to eat the kernel. The house sparrow, however, which is smaller, can not eat the seed whole and it also has difficulty cracking the seed open for the kernel. The sparrow will pick up a sunflower seed, bite it a few times, and if the hull does not part discards it and tries another. In this process many of the sunflower seeds are thrown out of the feeding station and this continues until the supply is gone. A flock of sparrows can throw a great quantity of seed out of a feeding station or consume it in a day. If the feeding station is constructed so that larger birds only are excluded and lighter birds are not, then the lighter birds will scatter the seed and the scattered seed attracts the larger unwanted birds which will consume great amounts of the scattered sunflower seeds leaving little or none for the cardinals. In addition they often chase the cardinals away. The expense of supplying such large quantities of sunflower seeds just to feed a few pair of cardinals together with the nuisance created by the other birds discourages most people to the extent that they reduce feeding intervals and feed only during adverse weather conditions. The cardinals finding little or no feed in the feeding stations, soon abandon the site and the pleasure of their presence is lost.

Heretofore bird feeders which prohibit heavier birds from gaining direct access to a feed supply have been used. However the problem still exists that when feeding sunflower seeds to cardinals house sparrows and lighter birds present in the area can obtain free access to the seed when only the birds heavier than cardinals are excluded. Thus the restricting effect of such a device is nullified.

Another problem in feeding sunflower seeds to cardinals is the accumulation of empty seed hulls which the cardinals drop into the feeding station after they crack the seed open. If the cardinals are permitted to crack the hulls and eat the kernels over or above the supply of sunflower seeds the hulls soon cover the remaining good seed and the cardinals have trouble searching out the whole seeds. Cleaning maintenance is usually required in feeders of such construction. Also bird feeders having restricting devices which use gates or doors that swing on hinges or slide in channels may jam and are unreliable in their operation because the seeds, empty hulls or other foreign matter may lodge in or between moving parts.

Further the construction of a selective bird feeder must be such that since it and its mechanism is exposed to weather such as rain and snow, it must work freely during such weather and keep the feed dry and visible to the birds to be fed.

It is therefore an object of this invention to provide a selective bird feeder which prohibits birds that are both lighter and heavier than the desired bird from feeding at the bird feeder.

It is a further object of this invention to provide a selective bird feeder which will induce the bird to crack the hull and eat the kernel outside of the feeder and will help clean empty hulls from the feeder by the action of the feeder.

It is a further object of this invention to provide a selective bird feeder having its sliding gate constructed so there are no channels or moving parts having an inner portion in which seeds, hulls or foreign matter will lodge to cause unreliable operation.

It is a further object of this invention to provide a selective bird feeder which has a mechanism that will be workable under adverse weather conditions and will keep the feed dry while at the same time exposing it to the birds.

Further objects and advantages of this invention will become apparent from the following drawings, descriptions and claims.

In the drawings FIG. 1 is a back view of the bird feeder, with a section cut away to show the gate. FIG. 2 is a side view of the bird feeder. FIG. 3 is an exploded isometric view of the bird feeder with the gate and its guides and the levers and weights shown in schematic form.

Referring to the drawings, the bird feeder has a gate 1 which is of wire mesh with an opening 2 therein. The gate 1 has at its two upper corners loops 3 which encircle guides 4. The guides 4 are fastened to the front of the feeder by driving the top section of the wire guides 4 into the sides 5 of the feeder and fastening the loops 4A on the bottom of the guides 4 to the bottom of the sides 5 of the feeder with the nails 6. The perch 7 is fastened to a lever 8. The lever 8 has loops 9 on either side of it which are fastened to the sides 5 of the feeder by the pivots 10. Washers 9A separate the loops 9 from the sides 5 of the feeder to give free action to the lever 8. Loops 11 at the lower end of the gate 1 encircle the lever 8 on either side of the perch 7. There are stop limits 12 to limit the upper and lower positions that the perch 7 can attain. A weight 13 is slideably attached to the end of the lever 8 and is held in place at the desired position by tightening the set screw 14. A lever 15 is fastened to the back 16 of the feeder by a pivot 17 through a loop 18 at one end of the lever 15. A washer (not shown) separates the loop 18 from the back 16 of the feeder to give free action to the lever 15. A stop 19 holds the lever 15 in horizontal position and a weight 20 is slideably attached to the end of the lever 15 and is held in place at the desired position by tightening the set screw 21. The lid 22 is removable from the feeder so that seed may be placed in the top of the feeder. The glass pieces 23 and 24 fit in slots 23A and 24A respectively in the sides 5 of the feeder. The floor 25 has located near its front edge a retaining lip 26. The glass piece 23 rests on the top of the glass piece 24 so that a trough 27 is formed into which the sunflower seed may flow.

The operation of the feeder is such that the upper and lower weight limits of the desired species of bird to be fed are first determined. Then the weights 13 and 20 are selected and set on the levers 8 and 15 respectively so as to exclude birds of weights outside these limits.

The resultant action of the feeder is that the perch 7 will be in position A with no bird on it. When a bird of less weight than the lower weight limit lands on the perch 7, the weight 13 causes the perch 7 to stay in position A. The lower portion of the gate 1 thus remains in front of the trough 27 and the lighter bird cannot reach the feed. When a bird within the desired weight limits lands on the perch 7 it drops to position B and stops due to the lever 8 encountering the lever 15 thus adding the weight 20 to counterbalance the desired bird. The opening 2 in the gate 1 is thus lowered to be in front of the trough 27 and the desired bird can place its head through the opening 2 and reach the feed. When a bird heavier than the upper weight limit lands on the perch 7 it drops all the way down to position C. The upper portion of the gate 1 thus drops in front of the trough 27 and the heavier bird cannot reach the feed. Thus weight 13 is selected and adjusted on lever 8 for the lower weight limit and weight 20 is selected and adjusted on lever 15 for the upper weight limit of the desired species of birds to be fed. The size of the weights 13 and 20 are selected in advance. Weight 13 will approximate the lower weight limit and the combined totals of weights 13 and 20 will approximate the upper weight limits. Weight 13 will be set approximately the same distance from loop 10 in lever 8 as is perch 7. The adjustment of positioning weight 13 on lever 8 is made to correct for error in choosing the weight 13 or to change the lower weight limit. The set screw 14 is then tightened to secure weight 13 on lever 8. Weight 20 normally will be set outside of weight 13 on lever 15. It may be moved on lever 15 to correct for error in choosing weight 20 or to change the upper weight limit.

A further action of the feeder is that since the loops 11 ride on the lever 8 they will tend to pull the gate 1 down close to the front of the feeder as the perch 7 is lowered. This tends to scrape any loose hulls that are on the outside of the lip 26 off of the floor 25. As the gate 1 raises from a lower position to position A it tends to travel away from the front of the feeder as far as the guides 4 will allow. This outward travel of gate 1 makes it swing past any empty hulls and then when lowered again it tends to pass close to the front of the feeder and will scrape the hulls off the front of the floor 25. Thus the feeder eliminates some of the need for cleaning maintenance. In addition when the desired bird reaches in through the opening 2 to get a seed he withdraws his head from the opening 2 in order to crack the seed outside of the feeder. Thus the hulls generally fall to the ground. In the withdrawing of seeds from the trough 27 the occasional hulls that are left in the trough 27 will also be raked out by the eating operation of the desired birds. Thus the combined action of the desired birds eating from the feeder and the movement of the gate 1 make the feeder maintenance free.

The glass pieces 23 and 24 expose the seed to the birds thus attracting them to the feeder. The attraction of the feeder using glass is greatly increased over that when wooden pieces are used in positions 23 and 24.

It should also be noted that the perch 7 must be narrow enough and the opening 2 must be small enough so that only one of the desired birds can land on the perch 7 and feed at one time. If two lighter birds land on the perch 7 to feed and their combined weight is within the upper and lower weight limits at first it seems as if the purpose is defeated. However it has been discovered that no two lighter birds will land on the perch 7 and feed side by side through the opening 2 in that they are not compatible enough to feed in pairs and especially through an opening the size of the opening 2.

It is further found that it does take a period of time for cardinals to become accustomed to using this type of a selective bird feeder but that after they have mastered its operation the cardinals learn that they alone can feed out of the feeder and that the lighter and the heavier birds are both excluded from the use of the feeder. Thus with this invention a specie of bird within certain weight limits can be induced to feed at the selective bird feeder to the exclusion of all other specie not within the weight limits.

I claim:
1. A selective bird feeder comprised of
a housing for feed,
a trough in the housing,
a first lever having a perch at one end and a weight adjustably attached to its other end,
the first lever pivotably attached to the housing at a point between the perch and the weight so that the perch is in close proximity to the trough,
a second lever having one end pivotably attached to the housing and extending outwardly over the first lever so that the second lever will encounter the first lever upon movement of the first lever,
a weight adjustably attached to the other end of the second lever,
stop limits on the housing to limit the movement of the first lever and the second lever,
a gate slideably attached to the housing and to the first lever,
a centrally located opening in the gate,
the gate positioned between the perch and the trough so as to prevent access to the trough except through its opening upon movement of the first lever so as to encounter the second lever.

2. A selective bird feeder comprised of
a housing for feed,
the housing having a glass front,
a second glass piece and a floor located in the housing so as to form a trough,
a retaining lip located in the trough,
a first lever having a perch at one end and a weight adjustably attached to its other end,
the first lever pivotably attached to the housing at a point between the perch and the weight so that the perch is in close proximity to the trough,
a second lever having one end pivotably attached to the housing and extending outwardly over the first lever so that the second lever will encounter the first lever upon movement of the first lever,
a weight adjustably attached to the other end of the second lever,
stop limits on the housing to limit the movement of the first lever and the second lever,
a gate slideably attached to the housing and to the first lever,
a centrally located opening in the gate,
the gate positioned between the perch and the trough so as to prevent access to the trough except through its opening upon movement of the first lever so as to encounter the second lever.

3. A selective bird feeder comprised of
a housing for feed,
the housing having a glass front,
a second glass piece and a floor located in the housing so as to form a trough,
a retaining lip located in the trough,
a first lever having a perch at one end and a weight adjustably attached to its other end so as to counterbalance a bird on the perch up to a certain weight limit,
the first lever pivotably attached to the housing at a point between the perch and the weight so that the perch is in close proximity to the trough,
a second lever having one end pivotably attached to the housing and extending outwardly over the first lever so that the second lever will encounter the first lever upon movement of the first lever,
a weight adjustably attached to the other end of the second lever so that upon movement of the first lever so as to encounter the second lever the weights will combine so as to counterbalance a bird on the perch up to an additional weight limit, stop limits on the housing to limit the movement of the first lever and the second lever, a gate slideably attached to the housing and to the first lever, a centrally located opening in the gate, the gate positioned between the perch and the trough so as to prevent access to the trough except through its opening upon movement of the first lever so as to encounter the second lever, the opening in the gate located so that upon movement of the first lever so as to encounter the second lever a bird on the perch will have access to the trough through the opening in the gate.

References Cited by the Examiner

UNITED STATES PATENTS

| | | | |
|---|---|---|---|
| 2,595,324 | 5/1952 | Baker | 119—55 |
| 2,918,901 | 12/1959 | Poulsen | 119—51 |
| 2,965,070 | 12/1960 | Myrick | 119—51 |
| 3,125,103 | 3/1964 | Stainbrook | 119—51 |
| 3,164,130 | 1/1965 | Curtis et al. | 119—51 |

SAMUEL KOREN, *Primary Examiner.*

ALDRICH F. MEDBERY, *Examiner.*